UNITED STATES PATENT OFFICE.

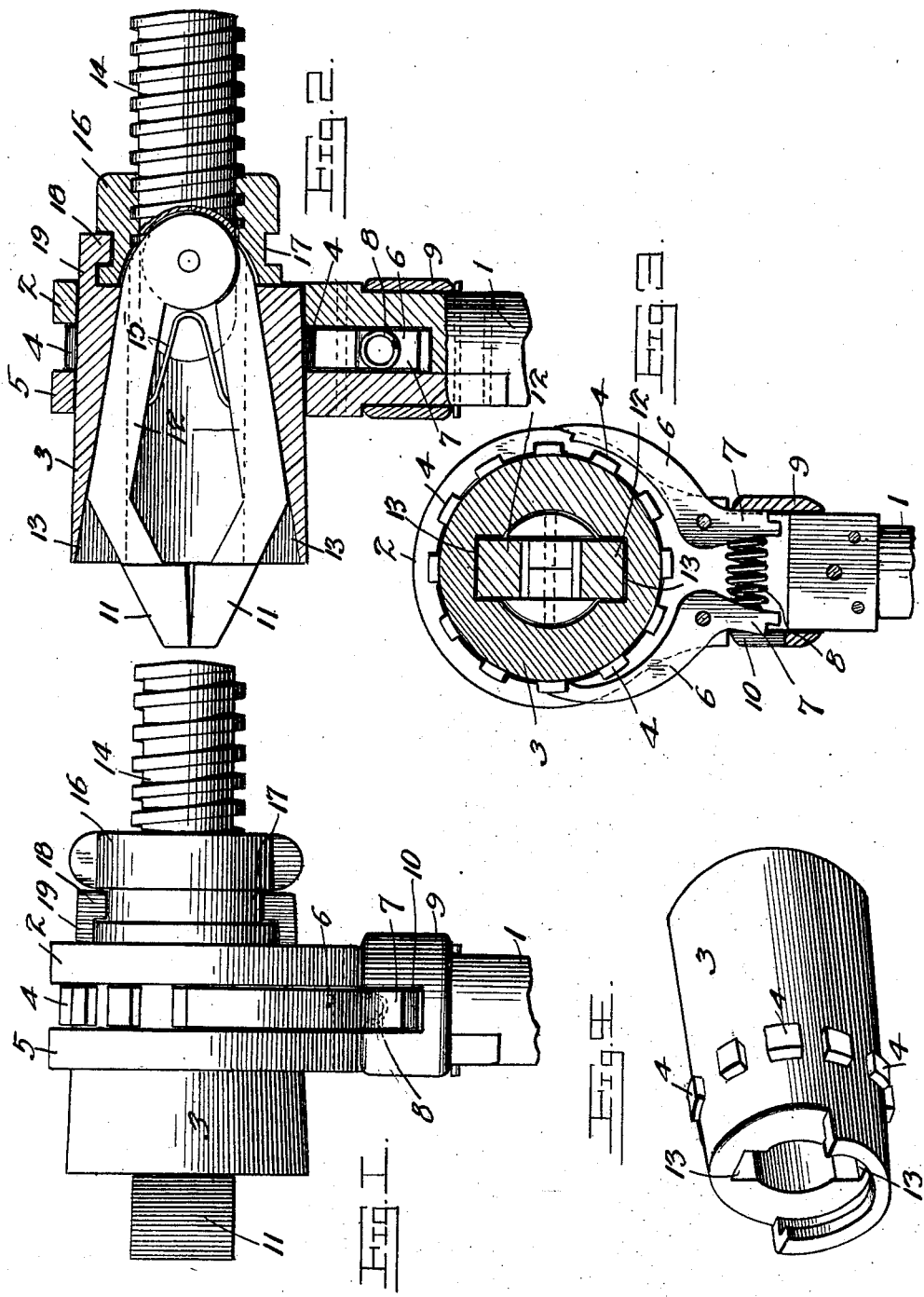

WILLIAM T. GARRETT, OF CEDARVILLE, CALIFORNIA, ASSIGNOR OF ONE-HALF TO JAMES A. STREET, OF CEDARVILLE, CALIFORNIA.

RATCHET-WRENCH.

SPECIFICATION forming part of Letters Patent No. 690,647, dated January 7, 1902.

Application filed June 18, 1901. Serial No. 65,053. (No model.)

*To all whom it may concern:*

Be it known that I, WILLIAM T. GARRETT, a citizen of the United States, residing at Cedarville, in the county of Modoc and State of California, have invented a new and useful Ratchet-Wrench, of which the following is a specification.

This invention relates to ratchet-wrenches, and has for its object to provide an improved device of this character, which is arranged for the convenient assemblage and removal of the parts and to facilitate the operation of the device. It is furthermore designed to compactly assemble the parts and house the same against damage and to provide for the convenient adjustment of the jaws to fit objects of different sizes.

With these and other objects in view the present invention consists in the combination and arrangement of parts, as will be hereinafter more fully described, shown in the accompanying drawings, and particularly pointed out in the appended claim, it being understood that changes in the form, proportion, size, and minor details may be made within the scope of the claim without departing from the spirit or sacrificing any of the advantages of the invention.

In the drawings, Figure 1 is a side elevation of a wrench embodying the present invention. Fig. 2 is a central longitudinal sectional view thereof. Fig. 3 is a transverse sectional view. Fig. 4 is a detail perspective view of the rotatable chuck.

Like characters of reference designate corresponding parts in all of the figures of the drawings.

In carrying out the invention there is provided a shank-handle 1, which has one end reduced in thickness and provided with an enlarged circular head 2, having a circular opening for the reception of a rotatable cylindrical or tubular chuck 3, which is slightly tapered and has its smaller end portion received within the head. Upon the exterior of the chuck and at the inner side of the head there is provided a marginal series of teeth 4, and embracing the chuck at the opposite side of the series of teeth there is provided a duplicate circular head 5, which is removably secured to the handle by means of suitable fastenings and is formed in half-sections, so as to be applied from opposite sides of the tapered chuck. By this arrangement the marginal series of teeth 4 lie between the opposite heads or bands, so as to prevent endwise displacement of the chuck and at the same time permit rotation thereof upon the handle.

To rotate the chuck by means of the handle, there is provided the opposite dogs 6, which are pivotally mounted between the opposite heads or bands and between the chuck and the adjacent end of the handle, with their outer free ends formed for engagement with the teeth. The inner ends of the dogs are provided with tailpieces 7, that are angularly related with respect to the dogs and extend rearwardly in the direction of the handle. Between these dogs, or rather between the tailpieces, there is interposed a coiled spring 8 to force the outer free ends of the dogs into engagement with the teeth, thereby to form a ratchet connection between the handle and the chuck. A rotatable collar or band 9 is mounted upon the handle, or rather the shank portions of the heads 2 and 5, which merge into the handle, so as to embrace the tailpieces, which are projected outwardly in opposite directions between the heads. When the band is in engagement with the tailpieces, they are forced inwardly, so as to throw the outer ends thereof out of engagement with the teeth of the chuck, and in order that one dog may be active and the other inactive the inner edge of the band is provided with a notch or opening 10, which is designed to be registered with one of the tailpieces to permit of the latter being sprung outwardly by the spring, and thereby throw its opposite end into engagement with the chuck while the other dog is held out of engagement with the chuck. By reversing the position of the band the other dog may be brought into engagement with the chuck, and thus the latter may be rotated in opposite directions.

For gripping a nut or the like there is provided a pair of jaws 11, which have shanks 12, that lie in beveled or inclined grooves 13, formed in the inner side of the chuck, said grooves or ways being inclined inwardly in opposite directions from the outer and larger end of the chuck and extend entirely through the same from end to end thereof. The ends of the shanks which are opposite the jaws are mutually pivoted within the bifurcated inner end of a screw-threaded stem 14, which is projected outwardly through the smaller end of the chuck. A substantially V-shaped spring 15 is interposed between the shanks to yieldably spread the same and hold them in the respective ways 13. Upon the stem there is fitted an adjusting device in the form of a circular-winged nut 16, which has an intermediate external marginal groove 17 formed therein and designed for the reception of the inner marginal shoulder 18, formed upon the outer end of the substantially semicylindrical flange 19, formed integral with the inner and smaller end of the chuck, whereby the nut is swiveled to the chuck, and by turning the nut the stem and the jaws may be adjusted longitudinally in opposite directions to open and close the jaws under the action of the inclined ways and the spring 15. By having the semicylindrical flange the nut may be engaged sidewise therewith and then the stem inserted through the outer end of the chuck and engaged with the nut in a convenient manner.

From the foregoing description it is apparent that all of the parts are accessible for repairs and are also housed against damage and displacement, the ratchet-dogs being conveniently adjustable to permit of the wrench being operated in opposite directions.

What is claimed is—

In a ratchet-wrench, the combination of a handle, having an enlarged head formed in opposite sections which are spaced apart and having corresponding circular openings, a cylindrical rotatable chuck mounted within the openings of the head, and also provided with an intermediate external marginal series of teeth received between the head-sections, one end of the chuck having a substantially semicylindrical flange, provided with an inner marginal shoulder, there being opposite longitudinal ways formed in the interior of the chuck and converged toward the flanged end of the chuck, opposite ratchet-dogs pivoted between the inner portions of the heads and in operative relation to the ratchet-teeth of the chuck, a spring interposed between the rear ends of the dogs, a rotatable band mounted upon the handle and embracing the rear ends of the dogs, there being a notch formed in one side of the band for the reception of the rear end of either dog, a pair of jaws, having shanks mounted in the ways of the chuck, a screw-threaded stem having its inner end pivotally connected to the shanks and projected outwardly through the flanged end of the chuck, a spring interposed between the shanks of the jaws, and a circular adjusting-nut fitted to the stem, and having an outer marginal groove receiving the shoulder of the semicylindrical flange, whereby the nut is swiveled to the chuck.

In testimony that I claim the foregoing as my own I have hereto affixed my signature in the presence of two witnesses.

WILLIAM T. GARRETT.

Witnesses:
D. S. DENEHY,
JOHN FRITZ.